US008203309B2

(12) United States Patent
Maegawa

(10) Patent No.: US 8,203,309 B2
(45) Date of Patent: Jun. 19, 2012

(54) BATTERY PACK, AND BATTERY SYSTEM

(75) Inventor: Kazuya Maegawa, Osaka (JP)

(73) Assignee: Panasonic Corporation, Osaka (JP)

(*) Notice: Subject to any disclaimer, the term of this patent is extended or adjusted under 35 U.S.C. 154(b) by 268 days.

(21) Appl. No.: 12/682,851

(22) PCT Filed: Aug. 29, 2008

(86) PCT No.: PCT/JP2008/002373
§ 371 (c)(1),
(2), (4) Date: Apr. 13, 2010

(87) PCT Pub. No.: WO2009/050842
PCT Pub. Date: Apr. 23, 2009

(65) Prior Publication Data
US 2010/0237828 A1  Sep. 23, 2010

(30) Foreign Application Priority Data

Oct. 19, 2007 (JP) .................................. 2007-273015

(51) Int. Cl.
*H01M 10/46* (2006.01)
(52) U.S. Cl. ....................................................... 320/128
(58) Field of Classification Search .................. 320/107, 320/116, 118, 127, 128, 132, 134, 136
See application file for complete search history.

(56) References Cited

U.S. PATENT DOCUMENTS

| 4,645,996 A * | 2/1987 | Toops ........................... 320/106 |
| 6,710,992 B2 * | 3/2004 | Pannwitz et al. ............. 361/93.2 |
| 2003/0071677 A1 * | 4/2003 | Shimozono .................... 327/538 |

FOREIGN PATENT DOCUMENTS

| JP | 4-075430 | 3/1992 |
| JP | 2002-313439 | 10/2002 |
| JP | 2006-246595 | 9/2006 |
| JP | 2007-018868 | 1/2007 |

* cited by examiner

*Primary Examiner* — Edward Tso
(74) *Attorney, Agent, or Firm* — McDermott Will & Emery LLP

(57) ABSTRACT

An object of the present invention is to provide a battery pack and a battery system capable of reducing unnecessary power loss upon reducing the variation in the state of charge that has occurred between a plurality of secondary batteries in an assembled battery in which the secondary batteries are connected in series-parallel. The battery pack and the battery system include a switching element Q11 for opening/closing the charging path of a battery pack B1, a switching element Q12 for opening/closing the discharging path of the battery pack B1, a switching element Q21 for opening/closing the charging path of a battery pack B2, and a switching element Q22 for opening/closing the discharging path of the battery pack B2. When the battery pack B1 is charged, the switching elements Q12, Q21 are turned OFF and the switching element Q11 is turned ON until the secondary batteries B11, B12 are fully charged. When the battery pack B2 is charged, the switching elements Q22, Q11 are turned OFF and the switching element Q21 is turned ON until the secondary batteries B21, B22 are fully charged.

11 Claims, 5 Drawing Sheets

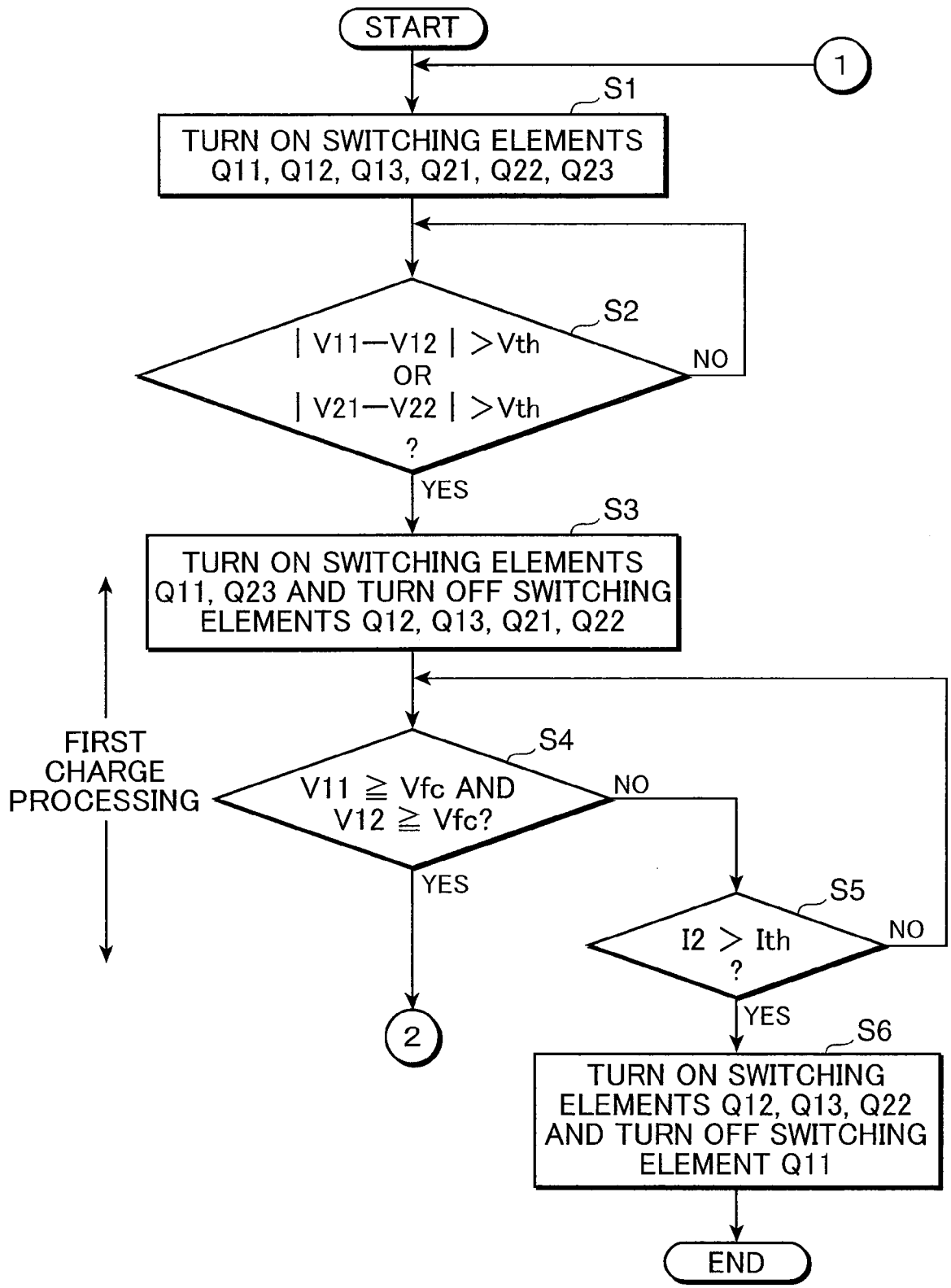

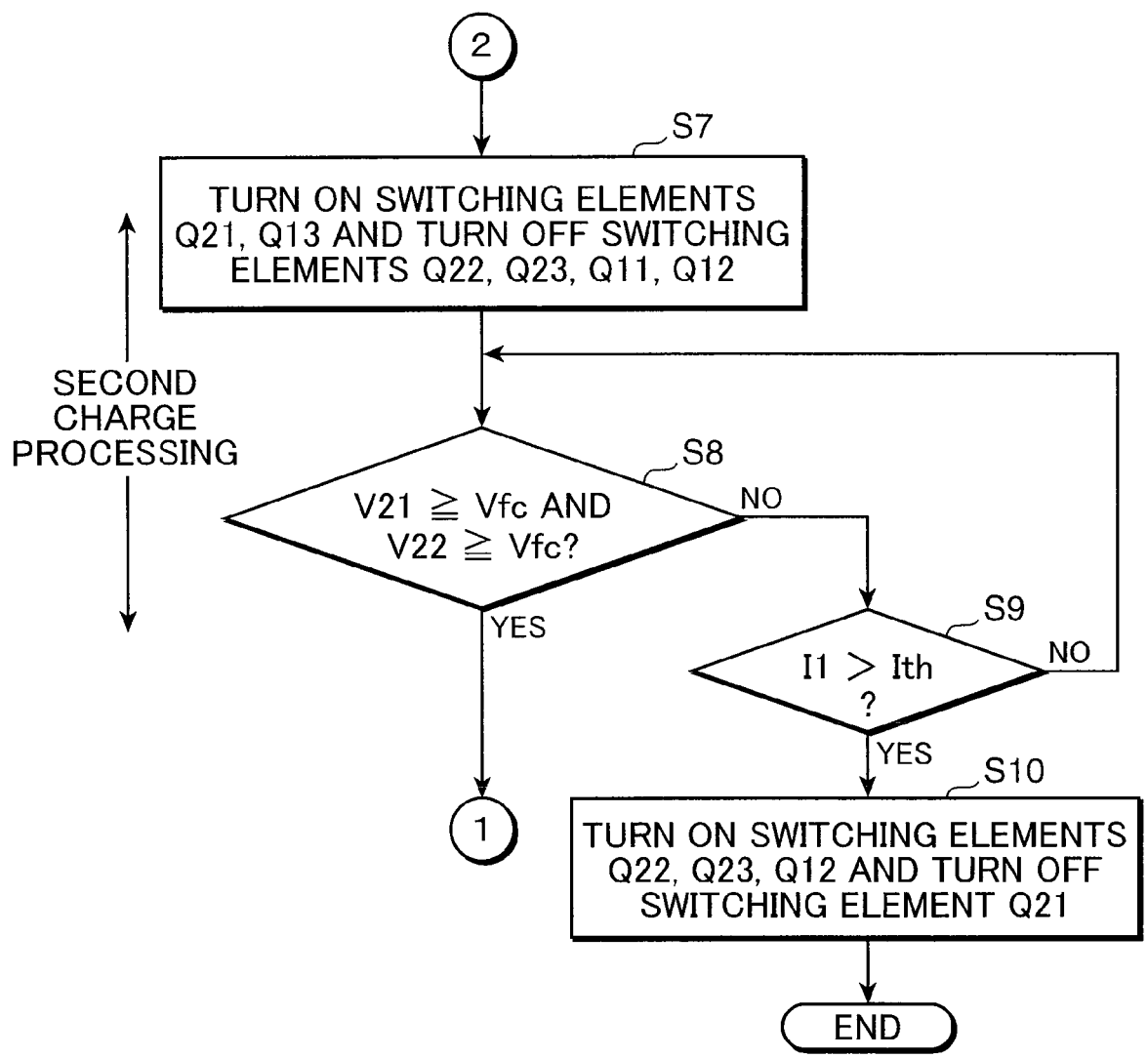

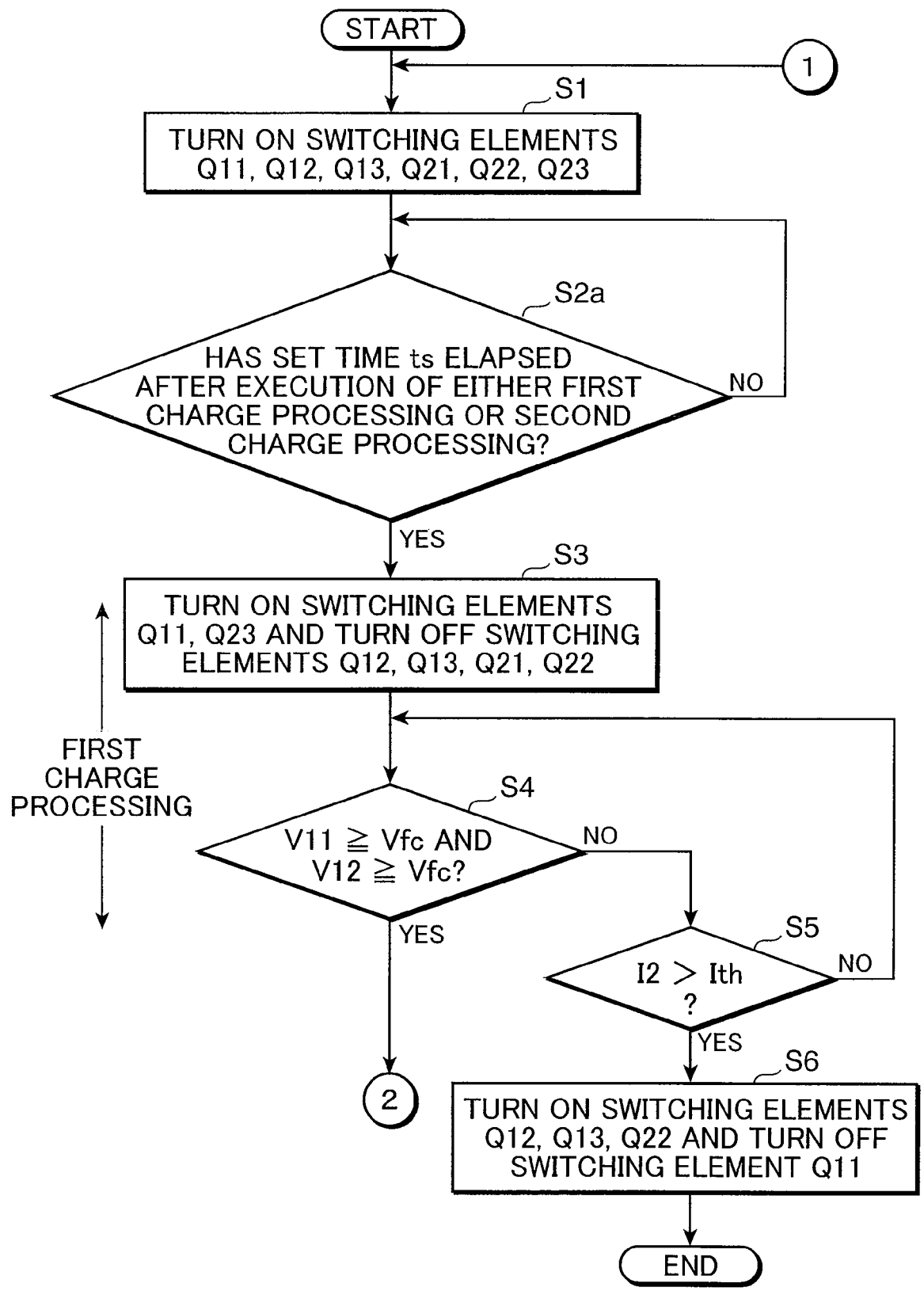

BATTERY PACK, AND BATTERY SYSTEM

This application is the U.S. National Phase under 35 U.S.C. § 371 of International Application No. PCT/JP2008/002373, filed on Aug. 29, 2008, which in turn claims the benefit of Japanese Application No. 2007-273015, filed on Oct. 19, 2007, the disclosures of which Applications are incorporated by reference herein.

TECHNICAL FIELD

The present invention relates to a battery pack in which a plurality of secondary batteries are connected in parallel, and a battery system.

BACKGROUND ART

When using a rechargeable battery pack including a plurality of secondary batteries connected in series as described in Patent Document 1, it is generally known that variation will arise in the quantity of accumulated charge of the batteries while they are being used, and the continued use thereof may cause only certain secondary batteries to become an overcharged state or an overdischarged state, whereby the expected life may become shortened or the secondary batteries may become an unsafe state. Thus, in order to resolve the variation in the state of charge (charging capacity) of the respective secondary batteries, a control method is known where charging is performed until the secondary battery with the smallest quantity of accumulated charge is fully charged and intentionally causing the other secondary batteries to become an overcharged state so as to eliminate any variation in the state of charge in all secondary batteries.

Nevertheless, according to the foregoing control method, in cases where an assembled battery in which a plurality of secondary batteries are connected in series is additionally connected in parallel, if a charging current is supplied to the assembled battery in order to cause the assembled battery with a variation in the state of charge to become an overcharged state, the charging current will also be supplied to an assembled that is connected in parallel to the foregoing assembled battery in which no variation has occurred. Thus, there was an inconvenience in that unnecessary power loss will increase.

Patent Document 1: Japanese Patent Application Laid-open No. H4-75430

DISCLOSURE OF THE INVENTION

The present invention was devised in view of the foregoing circumstances. Thus, an object of this invention is to provide a battery pack and a battery system capable of reducing unnecessary power loss upon reducing the variation in the state of charge that occurred between the respective secondary batteries in cases where an assembled battery in which a plurality of secondary batteries are connected in series is connected in parallel.

The battery pack according to one aspect of the present invention comprises first and second assembled batteries as assembled batteries in which a plurality of secondary batteries are connected in series, a charge terminal for receiving a charging current for charging the first and second assembled batteries, a discharge terminal for supplying a discharging current output from the first and second assembled batteries to a load, a first charge switch unit for opening/closing a first charging path extending from the charge terminal to the first assembled battery, a first discharging path switch unit for opening/closing a first discharging path extending from the first assembled battery to the discharge terminal, a second charge switch unit for opening/closing a second charging path extending from the charge terminal to the second assembled battery, a second discharging path switch unit for opening/closing a second discharging path extending from the second assembled battery to the discharge terminal, and a control unit for executing, upon charging the first assembled battery, first charge processing of turning OFF the first discharging path switch unit and the second charge switch unit and turning ON the first charge switch unit until all secondary batteries contained in the first assembled battery are fully charged, and executing, upon charging the second assembled battery, second charge processing of turning OFF the second discharging path switch unit and the first charge switch unit and turning ON the second charge switch unit until all secondary batteries contained in the second assembled battery are fully charged.

Moreover, the battery system according to one aspect of the present invention comprises first and second assembled batteries as assembled batteries in which a plurality of secondary batteries are connected in series, a charge terminal for receiving a charging current for charging the first and second assembled batteries, a charging current supply unit for supplying the charging current to the charge terminal, a discharge terminal for supplying a discharging current output from the first and second assembled batteries to a load, a first charge switch unit for opening/closing a first charging path extending from the charge terminal to the first assembled battery, a first discharging path switch unit for opening/closing a first discharging path extending from the first assembled battery to the discharge terminal, a second charge switch unit for opening/closing a second charging path extending from the charge terminal to the second assembled battery, a second discharging path switch unit for opening/closing a second discharging path extending from the second assembled battery to the discharge terminal, and a control unit for executing, upon charging the first assembled battery, first charge processing of turning OFF the first discharging path switch unit and the second charge switch unit and turning ON the first charge switch unit until all secondary batteries contained in the first assembled battery are fully charged, and executing, upon charging the second assembled battery, second charge processing of turning OFF the second discharging path switch unit and the first charge switch unit and turning ON the second charge switch unit until all secondary batteries contained in the second assembled battery are fully charged.

With the battery pack and battery system configured as described above, the first and second assembled batteries are connected in parallel when viewed from the charge terminal, and the first and second assembled batteries are connected in parallel when viewed from the discharge terminal. When charging the first assembled battery, the control unit turns OFF the first discharging path switch unit and the second charge switch unit so as to prohibit the charging current that was received by the charge terminal from being supplied to the second assembled battery. Subsequently, as a result of the control unit turning ON the first charge switch unit and all secondary batteries contained in the first assembled battery being charged until they are fully charged, the variation in the state of charge between the respective secondary batteries contained in the first assembled battery will decrease. Here, since the current supply to the second assembled battery is prohibited, it is possible to reduce the unnecessary power loss upon reducing the variation in the state of charge in the first assembled battery.

Moreover, when charging the second assembled battery, the control unit turns OFF the second discharging path switch unit and the first charge switch unit so as to prohibit the charging current that was received by the charge terminal from being supplied to the first assembled battery. Subsequently, as a result of the control unit turning ON the second charge switch unit and all secondary batteries contained in the second assembled battery being charged until they are fully charged, the variation in the state of charge between the respective secondary batteries contained in the second assembled battery will decrease. Here, since the current supply to the first assembled battery is prohibited, it is possible to reduce the unnecessary power loss upon reducing the variation in the state of charge in the second assembled battery.

BRIEF DESCRIPTION OF THE DRAWINGS

FIG. 3 is a flowchart showing an example of the operation of the battery system and the battery pack shown in FIG. 1.

FIG. 4 is a flowchart showing an example of the operation of the battery system and the battery pack shown in FIG. 1.

FIG. 5 is a diagram showing a modified example of the flowchart shown in FIG. 3.

BEST MODE FOR CARRYING OUT THE INVENTION

Figure 1:
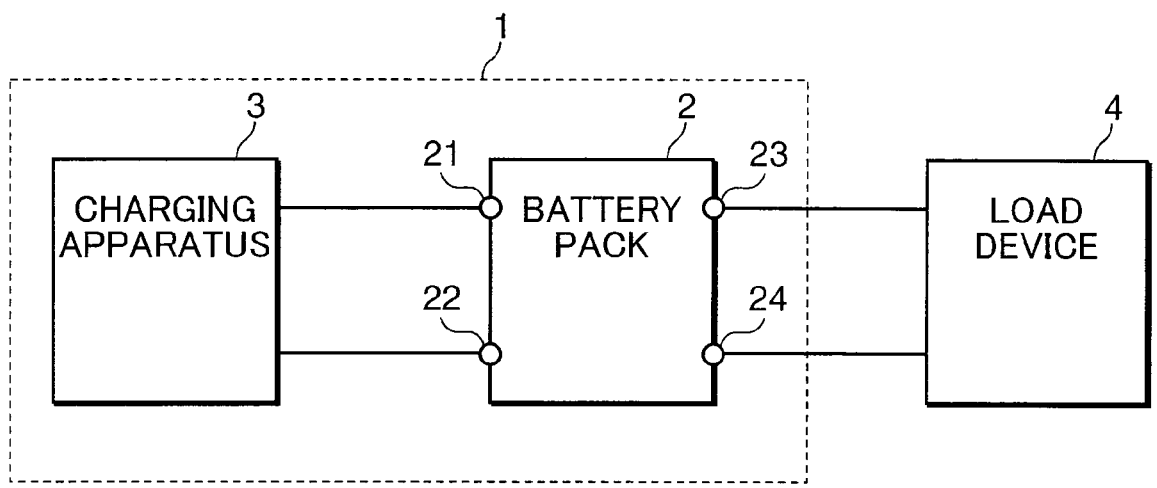
FIG. 1 is a block diagram showing an example of the configuration of the battery system according an embodiment of the present invention.

An embodiment of the present invention is now explained with reference to the attached drawings. Incidentally, configurations that are given the same reference numeral in the respective drawings mean that they are of the same configuration, and the explanation thereof is omitted. FIG. 1 is a block diagram showing an example of the configuration of the battery system according to an embodiment of the present invention. The battery system 1 shown in FIG. 1 comprises a battery pack 2, and a charging apparatus 3 (charging current supply unit).

The charging apparatus 3 is a power circuit for outputting a charging current for charging the battery pack 2. The battery pack 2 comprises connecting terminals 21, 22, 23, 24. The connecting terminals 21, 22 are charge terminals for receiving the charging current output from the charging apparatus 3, and are connected to the charging apparatus 3. The connecting terminals 23, 24 are discharge terminals for supplying the discharging current from the battery pack 2 to the load, and a load device 4 is connected thereto.

The connecting terminals 21, 22, 23, 24 will suffice so as long as they are able to electrically connect the battery pack 2 and the charging apparatus 3, or the battery pack 2 and the load device 4 and, for example, they may be electrodes, connectors, terminal blocks or the like, or a wiring pattern such as a land or pad. In addition, the battery pack 2 and the charging apparatus 3 and the load device 4 may be integrally configured in order to configure the electrical equipment to be driven by batteries.

Figure 2:
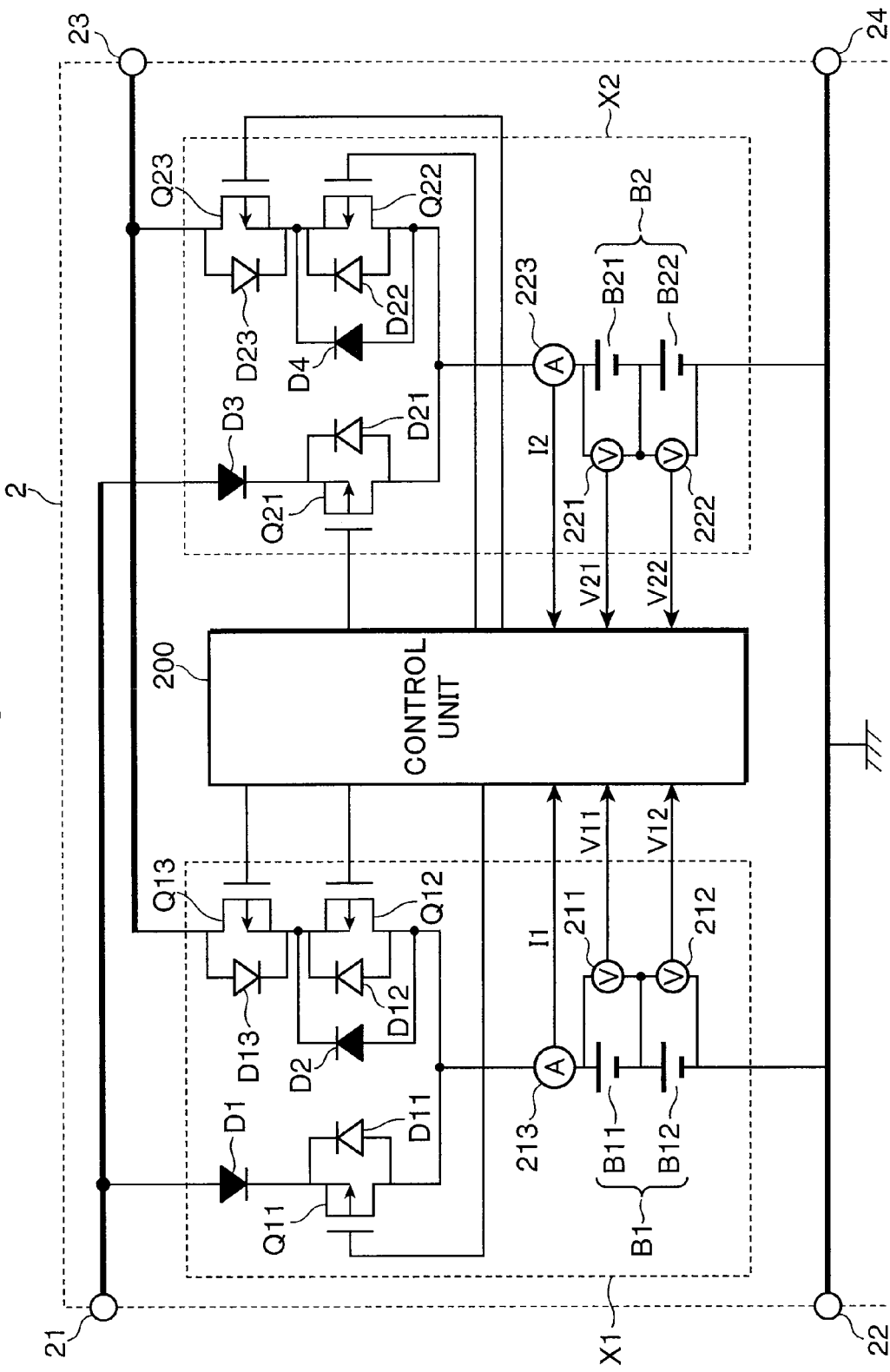
FIG. 2 is a circuit diagram showing an example of the configuration of the battery pack shown in FIG. 1.

FIG. 2 is a circuit diagram showing an example of the configuration of the battery pack 2 shown in FIG. 1. The battery pack 2 shown in FIG. 1 comprises circuit blocks X1, X2 respectively containing a battery block, a control unit 200, and connecting terminals 21, 22, 23, 24. The connecting terminals 22, 24 are connected to a negative electrode of the circuit blocks X1, X2 and used as the circuit ground.

The circuit blocks X1, X2 are connected in parallel between the connecting terminal 21 and the connecting terminals 22, 24. Moreover, the circuit blocks X1, X2 are connected in parallel between the connecting terminal 23 and the connecting terminals 22, 24. Incidentally, the number of circuit blocks to be connected in parallel; that is, the number of assembled batteries to be connected in parallel may be 3 or more.

The circuit block X1 comprises an assembled battery B1 (first assembled battery), a switching element Q11 (first charge switch unit), a switching element Q12 (first discharging path switch unit), a switching element Q13, diodes D1, D2, D11, D12, D13, voltage detection units 211, 212, and a current detection unit 213 (first current detection unit).

The circuit block X2 comprises an assembled battery B2 (second assembled battery), a switching element Q21 (second charge switch unit), a switching element Q22 (second discharging path switch unit), a switching element Q23, diodes D3, D4, D21, D22, D23, voltage detection units 221, 222, and a current detection unit 223 (second current detection unit).

The assembled battery B1 is configured by the secondary batteries B11, B12 being connected in series. The assembled battery B2 is configured by the secondary batteries B21, B22 being connected in series. Incidentally, the number of secondary batteries configuring the assembled batteries B1, B2 may be 3 or more, respectively.

The secondary batteries B11, B12, B21, B22 are secondary batteries in which the terminal voltage becomes constant at a prescribed full charge voltage when they are charged beyond a fully charged state. As the secondary batteries B11, B12, B21, B22, for example, nickel hydride secondary batteries or nickel cadmium secondary batteries are used.

When a nickel hydride secondary battery or a nickel cadmium secondary battery becomes an overcharged state, oxygen is generated from the positive electrode and is transferred to the negative electrode, and the oxygen is reduced with the negative electrode (Neumann mechanism). Since the foregoing transfer of oxygen is equivalent to the discharge of the charged charge, even if charging is continued in an overcharged state beyond a fully charged state, the terminal voltage of the nickel hydride secondary battery and the nickel cadmium battery will not rise any higher, and become a constant full charge voltage Vfc.

The secondary batteries B11, B12, B21, B22 are not limited to nickel hydride secondary batteries or nickel cadmium batteries, and will suffice so as long as they are secondary batteries such as nickel hydride secondary batteries in which the terminal voltage will become constant at a prescribed full charge voltage when they are charged beyond a fully charged state.

The switching elements Q11, Q12, Q13, Q21, Q22, Q23 are, for example, switching elements such as a semiconductor switching element or a relay. As the switching elements Q11, Q12, Q13, Q21, Q22, Q23, for instance, FET (Field Effect Transistor) is used. The diodes D11, D12, D13, D21, D22, D23 are the parasitic diodes of the switching elements Q11, Q12, Q13, Q21, Q22, Q23.

The voltage detection units 211, 212, 221, 222 are voltage detection circuits that detect the respective terminal voltages of the secondary batteries B11, B12, B21, B22 and output the detected terminal voltages as voltage values V11, V12, V21, V22 to the control unit 200, and are configured, for example, using an AD converter.

The current detection units 213, 223 are current detection circuit that detect the current flowing in the assembled batteries B1, B2 and output the detected current as current values I1, I2 to the control unit 200, and are configured, for example, using a current sensor such as a .shunt resistor or hall element.

The connecting terminal 21 is connected to a positive electrode of the assembled battery B1 via a first charging path configured from the diode D1, the switching element Q11, and the current detection unit 213. A negative electrode of the assembled battery B1 is connected to the connecting terminals 22, 24. The diode D1 is in a forward direction in relation to the charging current from the connecting terminal 21. The diode D1 prevents the discharging current of the assembled battery B1 from counterflowing from the connecting terminal 21 to the charging apparatus 3. The diode D11 is in a reverse direction in relation to the charging current from the connecting terminal 21.

A positive electrode of the assembled battery B1 is connected to the connecting terminal 23 via a first discharging path configured from the current detection unit 213, the switching element Q12, and the switching element Q13. Moreover, the diode D2 (first diode) is connected in parallel to the switching element Q12. The diodes D2, D12 are in a forward direction in relation to the discharging current from the assembled battery B1. The diode D13 is in a reverse direction in relation to the discharging current from the assembled battery B1.

In the foregoing case, although the configuration may be such that the diode D2 is not provided and the diode D12 is used as the first diode, since the diode D12 as the parasitic diode entails a large power loss, the power loss during the discharge of the assembled battery B1 can be reduced by providing the diode D2.

Moreover, the connecting terminal 21 is connected to a positive electrode of the assembled battery B2 via a second charging path configured from the diode D3, the switching element Q21, and the current detection unit 223. A negative electrode of the assembled battery B2 is connected to the connecting terminals 22, 24. The diode D3 is in a forward direction in relation to the charging current from the connecting terminal 21. The diode D3 prevents the discharging current of the assembled battery B2 from counterflowing from the connecting terminal 21 to the charging apparatus 3. The diode D21 is in a reverse direction in relation to the charging current from the connecting terminal 21.

The configuration may also be such that an FET is used in substitute for the diodes D1, D3 to prevent the counterflow. If the charging current increases, the loss based on the diodes D1, D3 will also increase. Thus, the power loss can be reduced with the configuration uses an FET in substitute for the diodes D1, D3 to prevent the counterflow.

A positive electrode of the assembled battery B2 is connected to the connecting terminal 23 via a second discharging path configured from the current detection unit 223, the switching element Q22, and the switching element Q23. The diode D4 (second diode) is connected in parallel to the switching element Q22. The diodes D4, D22 are in a forward direction in relation to the discharging current from the assembled battery B2. The diode D23 is in a reverse direction in relation to the discharging current from the assembled battery B2.

In the foregoing case, although the configuration may be such that the diode D4 is not provided and the diode D22 is used as the second diode, since the diode D22 as the parasitic diode entails a large power loss, the power loss during the discharge of the assembled battery B2 can be reduced by providing the diode D4.

The control unit 200 is configured by comprising, for example, a CPU (Central Processing Unit) for executing prescribed arithmetic processing, a nonvolatile ROM (Read Only Memory) storing prescribed control programs, a RAM (Random Access Memory) for temporarily storing data, and peripheral circuits thereof, and so on. The control unit 200 executes the control programs stored in the ROM and controls the ON/OFF of the switching elements Q11, Q12, Q13, Q21, Q22, Q23 based on the terminal voltages of the respective secondary batteries detected with the voltage detection units 211, 212, 221, 222, and the current flowing in the respective assembled batteries detected with the current detection units 213, 223.

When the control unit 200 detects, for example, the overcharge or overdischarge of the assembled batteries B1, B2, it turns OFF the switching elements Q11, Q21 or turns OFF the switching elements Q13, Q23 in order to prevent the deterioration of the assembled batteries B1, B2. In addition, the control unit 200 reduces the variation in the state of charge of the secondary batteries in the assembled batteries B1, B2 as follows.

The operation of the battery system 1 and the battery pack 2 shown in FIG. 1 is now explained. FIG. 3 and FIG. 4 are flowcharts showing an example of the operation of the battery system 1 and the battery pack 2 shown in FIG. 1. Foremost, as the initial processing, the control unit 200 turns ON the switching elements Q11, Q12, Q13, Q21, Q22, Q23, and the assembled batteries B1, B2 enter a chargeable/dischargeable state.

Subsequently, the control unit 200 respectively compares, with a pre-set threshold voltage Vth, the difference between the terminal voltage value V11 of the secondary battery B11 detected with the voltage detection unit 211 and the terminal voltage V12 of the secondary battery B12 detected with the voltage detection unit 212, and the difference between the terminal voltage value V21 of the secondary battery B21 detected with the voltage detection unit 221 and the terminal voltage value V22 of the secondary battery B22 detected with the voltage detection unit 222 (step S2).

As the threshold voltage Vth, for instance, 0.5V may be used, but the threshold voltage Vth may be variously set based on the type of secondary battery or the number of secondary batteries that are being used.

When at least the difference between the voltage value V11 and the voltage value V12 or the difference between the voltage value V21 and the voltage value V22 exceeds the threshold voltage Vth (YES at step S2), the control unit 200 determines that the variation in the terminal voltage; that is, variation in the state of charge between the respective secondary batteries has increased to the level that requires correction, and proceeds to step S3 in order to reduce the variation in the state of charge.

Meanwhile, if both the difference between the voltage value V11 and the voltage value V12 and the difference between the voltage value V21 and the voltage value V22 are not greater than the threshold voltage Vth (NO at step S2), the control unit 200 determines that the variation in the terminal voltage; that is, variation in the state of charge between the respective secondary batteries is sufficiently small, and repeats step S2 while the assembled batteries B1, B2 are maintained in a chargeable/dischargeable state.

Subsequently, at step S3, the control unit 200 turns ON the switching elements Q11, Q23 and turns OFF the switching elements Q12, Q13, Q21, Q22. Then, the charging current output from the charging apparatus 3 is supplied to the assembled battery B1 via the diode D1, the switching element Q11, and the current detection unit 213, and the secondary batteries B11, B12 are thereby charged.

Here, since the switching element Q21 is OFF, the charging current output from the charging apparatus 3 will not be supplied to the assembled battery B2, and the possibility of power loss arising as a result of the charging current being supplied to the assembled battery B2 when no variation is occurring in the assembled battery B2 can be reduced.

Moreover, since the switching elements Q13, Q22 are OFF, the possibility of the charging current output from the charging apparatus 3 being supplied to the assembled battery B2 as a result of coming around to the assembled battery B2 via the diode D1, the switching elements Q11, Q12, Q13, Q23, Q22, and the current detection unit 223 can be reduced.

In the foregoing case, although it is possible to prevent the current from coming around to the assembled battery B2 so as long as one of the switching elements Q13, Q22 is OFF, as a result of turning OFF both switching elements Q13, Q22, the reliability of the circuit can be improved as a result of the circuit becoming redundant.

Incidentally, as a configuration not provided with the diodes D4, D22, the switching element Q22 may be turned ON at step S3.

Moreover, the configuration may also be such that the charging apparatus 3 constantly applies the charging voltage between the connecting terminals 21, 22, and the control unit 200 controlling the charging of the assembled batteries B1, B2 by turning ON/OFF the switching elements Q11, Q21, or the configuration may be such that the charging current is output from the charging apparatus 3 as a result of the control unit 200 requesting the charging apparatus 3 to supply the charging current.

Subsequently, the control unit 200 respectively compares the voltage values V11, V12, which were detected with the voltage detection units 211, 212, with the full charge voltage Vfc (step S4). If the voltage value V11 becomes not less than the full charge voltage Vfc and the voltage value V12 becomes not less than the full charge voltage Vfc (YES at step S4), since the terminal voltage values V11, V12 of the secondary batteries B11, B12 will not change even if charging is continued, both voltage values V11, V12 will become the full charge voltage Vfc, the state of charge of the secondary batteries B11, B12 will be aligned, and the variation will decrease. Then, the control unit 200 proceeds to step S7 in order to reduce the variation in the state of charge of the secondary batteries B11, B12.

Meanwhile, at step S4, if either the voltage value V11 or the voltage value V12 is less than the full charge voltage Vfc (NO at step S4), since the variation in the state of charge of the secondary batteries B11, B12 has not been resolved, the control unit 200 proceeds to step S5.

At step S5, the control unit 200 compares the discharging current value 12 of the assembled battery B2, which was detected with the current detection unit 223, with the pre-set current threshold Ith (step S5). The current threshold Ith is a determination value for detecting that a discharging current from the assembled battery B2 has flowed, and is set to a small current value.

If there is no current supply from the assembled battery B2 to the load device 4 or if the discharging current value 12 is not greater than the current threshold Ith such as by the power switch of the load device 4 being turned OFF (NO at step S5), the control unit 200 returns once again to step S4 and the charging of the secondary batteries B11, B12 is continued.

Meanwhile, if the power switch of the load device 4 is turned ON, since the diodes D4, D22 are provided and the switching element Q23 is ON, the discharging current from the assembled battery B2 will flow from the assembled battery B2 to the load device 4 via the current detection unit 223, the diodes D4, D22, the switching element Q23, and the connecting terminal 23, and power is supplied thereby.

Consequently, the discharging current value 12 will exceed the current threshold Ith (YES at step 5), and the control unit 200 proceeds to step S6. Here, steps S3 to S5 correspond to an example of the first charge processing.

In the foregoing case, since the diodes D4, D22 and the switching element Q23 enable the power supply from the assembled battery B2 to the load device 4 even when the assembled battery B1 is being charged, it is possible to reduce the possibility of power not being supplied to the load device 4 in order to perform the processing for resolving the variation in the state of charge of the secondary batteries B11, B12.

At step S6, the control unit 200 turns OFF the switching element Q11 to end the charging of the assembled battery B1, and turns ON the switching elements Q12, Q13, Q22 to supply the discharging current from the assembled battery B1 to the load device 4 via the current detection unit 213 and the switching elements Q12, Q13. Specifically, if the power supply to the load device 4 becomes required such as by the power switch of the load device 4 being turned ON, as a result of the discharging current value 12 exceeding the current threshold Ith and the control unit 200 proceeding to step S6, the assembled batteries B1, B2 will become dischargeable, and power can be supplied from the two assembled batteries B1, B2 to the load device 4. Thus, the possibility of the power supply to the load device 4 becoming insufficient can be reduced.

Here, it is also possible to turn ON the switching element Q11 so that the output current from the charging apparatus 3 is also supplied to the load device 4, or turn OFF the switching element Q11 to prevent the output current from the charging apparatus 3 from being supplied to the load device 4.

Subsequently, at step S7, the control unit 200 turns ON the switching elements Q21, Q13 and turns OFF the switching elements Q22, Q23, Q11, Q12. Consequently, the charging current output from the charging apparatus 3 will be supplied to the assembled battery B2 via the diode D3, the switching element Q21, and the current detection unit 223, and the secondary batteries B21, B22 are thereby charged.

Here, since the switching element Q11 is OFF, the charging current output from the charging apparatus 3 will not be supplied to the assembled battery B1, and the possibility of power loss arising as a result of the charging current being supplied to the assembled battery B1 when no variation is occurring in the assembled battery B1 can be reduced.

Moreover, since the switching elements Q23, Q12 are OFF, the possibility of the charging current output from the charging apparatus 3 being supplied to the assembled battery B1 as a result of coming around to the assembled battery B1 via the diode D3, the switching elements Q21, Q22, Q23, Q13, Q12, and the current detection unit 213 can be reduced.

In the foregoing case, although it is possible to prevent the current from coming around to the assembled battery B1 so as long as one of the switching elements Q23, Q12 is OFF, as a result of turning OFF both switching elements Q23, Q12, the reliability of the circuit can be improved as a result of the circuit becoming redundant.

Incidentally, as a configuration not provided with the diodes D2, D12, the switching element Q12 may be turned ON at step S7.

Subsequently, the control unit 200 respectively compares the voltage values V21, V22, which were detected with the voltage detection units 221, 222, with the full charge voltage Vfc (step S8). If the voltage value V21 becomes not less than the full charge voltage Vfc and the voltage value V22 becomes not less than the full charge voltage Vfc (YES at step S8), since the terminal voltage values V21, V22 of the secondary batteries B21, B22 will not change even if charging is continued, both voltage values V21, V22 will become the full charge voltage Vfc, the state of charge of the secondary batteries B21, B22 will be aligned, and the variation will decrease.

In the foregoing case, since the terminal voltage values V11, V12 of the secondary batteries B11, B12 are already the full charge voltage Vfc based on the first charge processing of steps S3 to S5, the terminal voltages of all secondary batteries B11, B12, B21, B22 of the battery pack 2 will become the full charge voltage Vfc, and the variation in the state of charge will decrease.

The control unit 200 returns to step S1 in order to enable the normal charge/discharge by the battery pack 2.

Meanwhile, at step S8, if either the voltage value V21 or the voltage value V22 is less than the full charge voltage Vfc (NO at step S8), since the variation in the state of charge of the secondary batteries B21, B22 has not been resolved, the control unit 200 proceeds to step S9.

At step S9, the control unit 200 compares the discharging current value I1 of the assembled battery B1, which was detected with the current detection unit 213, with the pre-set current threshold Ith (step S9). The current threshold Ith is a determination value for detecting that a discharging current from the assembled battery B1 has flowed, and is set to a small current value.

If the discharging current value I1 is not greater than the current threshold Ith as a result of that there is no current supply from the assembled battery B1 to the load device 4 such as by the power switch of the load device 4 being turned OFF (NO at step S9), the control unit 200 returns once again to step S8 and the charging of the secondary batteries B21, B22 is continued.

Meanwhile, if the power switch of the load device 4 is turned ON, since the diodes D2, D12 are provided and the switching element Q13 is ON, the discharging current from the assembled battery B1 will flow from the assembled battery B1 to the load device 4 via the current detection unit 213, the diodes D2, D12, the switching element Q13, and the connecting terminal 23, and power is supplied thereby.

Consequently, the discharging current value I1 will exceed the current threshold Ith (YES at step 9), and the control unit 200 proceeds to step S10. Here, steps S7 to S9 correspond to an example of the second charge processing.

In the foregoing case, since the diodes D2, D12 and the switching element Q13 enable the power supply from the assembled battery B1 to the load device 4 even when the assembled battery B2 is being charged, it is possible to reduce the possibility of power not being supplied to the load device 4 in order to perform the processing for resolving the variation in the state of charge of the secondary batteries B21, B22.

At step S10, the control unit 200 turns OFF the switching element Q21 to end the charging of the assembled battery B2, and turns ON the switching elements Q22, Q23, Q12 to supply the discharging current from the assembled battery B2 to the load device 4 via the current detection unit 223 and the switching elements Q22, 23. Specifically, if the power supply to the load device 4 becomes required such as by the power switch of the load device 4 being turned ON, as a result of the discharging current value I1 exceeding the current threshold Ith and the control unit 200 proceeding to step S10, the assembled batteries B1, B2 will become dischargeable, and power can be supplied from the two assembled batteries B1, B2 to the load device 4. Thus, the possibility of the power supply to the load device 4 becoming insufficient can be reduced.

Here, it is also possible to turn ON the switching element Q21 so that the output current from the charging apparatus 3 is also supplied to the load device 4, or turn OFF the switching element Q21 to prevent the output current from the charging apparatus 3 from being supplied to the load device 4.

Incidentally, at step S2, if only the difference between the terminal voltage value V11 and the terminal voltage value V12 exceeds the threshold voltage Vth, the configuration may be such that only steps S3, S4, S5, S6 are executed, and, if only the difference between the terminal voltage value V21 and the terminal voltage value V22 exceeds the threshold voltage Vth, the configuration may be such that only steps S7, S8, S9, S10 are executed.

Since it is possible to consider that the variation in the terminal voltage (state of charge) of the respective secondary batteries is arising after the lapse of a given period of time where the charge and discharge are repeated, for instance, as with step S2a shown in FIG. 5, the configuration may also be such that, when a set time ts elapses after the execution of either the first charge processing or second charge processing, the control unit 200 proceeds to step S3. Or, the configuration may be such that, when a set time ts elapses after the execution of the previous first charge processing, the control unit 200 once again executes steps S3 to S6 including the first charge processing, and, when a set time ts elapses after the execution of the previous second charge processing, the control unit 200 once again executes steps S7 to S9 including the second charge processing.

As the set time ts, for example, 1 month may be used, but the set time ts may be variously set based on the type or usage of secondary battery.

Specifically, the battery pack according to one aspect of the present invention comprises first and second assembled batteries as assembled batteries in which a plurality of secondary batteries are connected in series, a charge terminal for receiving a charging current for charging the first and second assembled batteries, a discharge terminal for supplying a discharging current output from the first and second assembled batteries to a load, a first charge switch unit for opening/closing a first charging path extending from the charge terminal to the first assembled battery, a first discharging path switch unit for opening/closing a first discharging path extending from the first assembled battery to the discharge terminal, a second charge switch unit for opening/closing a second charging path extending from the charge terminal to the second assembled battery, a second discharging path switch unit for opening/closing a second discharging path extending from the second assembled battery to the discharge terminal, and a control unit for executing, upon charging the first assembled battery, first charge processing of turning OFF the first discharging path switch unit and the second charge switch unit and turning ON the first charge switch unit until all secondary batteries contained in the first assembled battery are fully charged, and executing, upon charging the second assembled battery, second charge processing of turning OFF the second discharging path switch unit and the first charge switch unit and turning ON the second charge switch unit until all secondary batteries contained in the second assembled battery are fully charged.

According to this configuration, the first and second assembled batteries are connected in parallel when viewed from the charge terminal, and the first and second assembled batteries are connected in parallel when viewed from the discharge terminal. When charging the first assembled battery, the control unit turns OFF the first discharging path switch unit and the second charge switch unit so as to prohibit the charging current that was received by the charge terminal from being supplied to the second assembled battery. Subsequently, as a result of the control unit turning ON the first charge switch unit and all secondary batteries contained in the first assembled battery being charged until they are fully charged, the variation in the state of charge between the respective secondary batteries contained in the first assembled battery will decrease. Here, since the current supply to the second assembled battery is prohibited, it is possible to reduce the unnecessary power loss upon reducing the variation in the state of charge in the first assembled battery.

Moreover, when charging the second assembled battery, the control unit turns OFF the second discharging path switch unit and the first charge switch unit so as to prohibit the charging current that was received by the charge terminal from being supplied to the first assembled battery. Subsequently, as a result of the control unit turning ON the second charge switch unit and all secondary batteries contained in the second assembled battery being charged until they are fully charged, the variation in the state of charge between the respective secondary batteries contained in the second assembled battery will decrease. Here, since the current supply to the first assembled battery is prohibited, it is possible to reduce the unnecessary power loss upon reducing the variation in the state of charge in the second assembled battery.

Preferably, the secondary battery is a second battery configured such that, when charged beyond a fully charged state, the terminal voltage thereof becomes approximately constant at a prescribed full charge voltage.

According to this configuration, since the terminal voltage of the secondary battery with the lowest terminal voltage between a plurality of secondary batteries contained in the respective assembled batteries will be charged until it reaches the full charge voltage in each of the first and second assembled batteries, the terminal voltages of all secondary batteries contained in the assembled battery can be made to be the full charge voltage, it will be easy to reduce the variation in the terminal voltage; that is, the variation in the state of charge of the secondary batteries contained in the respective assembled batteries.

Preferably, the secondary battery is either a nickel hydride secondary battery or a nickel cadmium secondary battery.

A nickel hydride secondary battery and a nickel cadmium secondary battery are secondary batteries in which the terminal voltage becomes approximately constant at a prescribed full charge voltage when they are charged beyond the fully charged state.

Preferably, a voltage detection unit for detecting the respective terminal voltages of the plurality of secondary batteries is further provided, and the control unit executes the first charge processing when the difference between a maximum value and a minimum value of the respective terminal voltages of a plurality of secondary batteries contained in the first assembled battery that are detected with the voltage detection unit exceeds a pre-set threshold voltage, and executes the second charge processing when the difference between a maximum value and a minimum value of the respective terminal voltages of a plurality of secondary batteries contained in the second assembled battery that are detected with the voltage detection unit exceeds a pre-set threshold voltage.

According to this configuration, the voltage detection unit detects the respective terminal voltages of a plurality of secondary batteries. Moreover, if the difference between the maximum value and the minimum value of the respective terminal voltages of a plurality of secondary batteries contained in the first assembled battery that are detected with the voltage detection unit exceeds a pre-set threshold voltage, that is, if the variation in the state of charge in the plurality of secondary batteries increases beyond a certain level, the control unit executes the first charge processing, and the variation in the state of charge in the plurality of secondary batteries is reduced.

In addition, if the difference between the maximum value and the minimum value of the respective terminal voltages of a plurality of secondary batteries contained in the second assembled battery that are detected with the voltage detection unit exceeds a pre-set threshold voltage, that is, if the variation in the state of charge in the plurality of secondary batteries increases beyond a certain level, the control unit executes the second charge processing, and the variation in the state of charge in the plurality of secondary batteries is reduced.

Preferably, the control unit executes the first and second charge processing when the difference between a maximum value and a minimum value of the respective terminal voltages of a plurality of secondary batteries contained in the first assembled battery that are detected with the voltage detection unit exceeds a pre-set threshold voltage, and when the difference between a maximum value and a minimum value of the respective terminal voltages of a plurality of secondary batteries contained in the second assembled battery that are detected with the voltage detection unit exceeds a pre-set threshold voltage.

According to this configuration, if the difference between the maximum value and the minimum value of the respective terminal voltages of a plurality of secondary batteries contained in the first assembled battery that are detected with the voltage detection unit exceeds a pre-set threshold voltage, and if the difference between the maximum value and the minimum value of the respective terminal voltages of a plurality of secondary batteries contained in the second assembled battery that are detected with the voltage detection unit exceeds a pre-set threshold voltage, that is, if the difference between the maximum value and the minimum value of the respective terminal voltages of a plurality of secondary batteries contained in either the first assembled battery or the second assembled battery that are detected with the voltage detection unit exceeds a pre-set threshold voltage and the variation in the state of charge increases beyond a certain level, the control unit executes the first and second charge processing so that all secondary batteries contained in the first and second assembled batteries are charged to a fully charged state, and the state of charge will be aligned not only in the respective assembled batteries, but also between the respective assembled batteries.

Moreover, when a pre-set set time elapses after executing the previous first charge processing, the control unit may execute the first charge processing once again, and when a pre-set set time elapses after executing the previous second charge processing, the control unit may execute the second charge processing once again.

After the lapse of some time after the variation in the state of charge has been reduced, it is likely that the variation will arise once again. Thus, if the control unit executes the first charge processing once again when a pre-set set time elapses after executing the previous first charge processing, and if the control unit executes the second charge processing once again when a pre-set set time elapses after executing the previous second charge processing, it will not be necessary to detect the respective terminal voltages of a plurality of secondary batteries and monitor the developmental state of variation. Thus, as a result of no longer requiring the voltage detection unit for detecting the respective terminal voltages of a plurality of secondary batteries, it will be easy to simplify the circuit while reducing the variation in the state of charge in a plurality of secondary batteries.

Preferably, the control unit executes the first and second charge processing when a pre-set set time elapses after executing either the first charge processing or the second charge processing.

According to this configuration, since the control unit executes both the first and second charge processing when a pre-set set time elapses after the execution of either the first charge processing or the second charge processing, all secondary batteries containing the first and second assembled batteries will be charged to a fully charged state, and the state of charge will be aligned not only in the respective assembled batteries, but also between the respective assembled batteries.

Preferably, a first current detection unit for detecting a discharging current of the first assembled battery, and a second current detection unit for detecting a discharging current of the second assembled battery are further provided, and the control unit turns ON the second discharging path switch unit in the first charge processing, turns ON the first discharging path switch unit in the second charge processing, turns ON the first discharging path switch unit and ends the first charge processing if a discharging current of the second assembled battery is detected with the second current detection unit during the execution of the first charge processing, and turns ON the second discharging path switch unit and ends the second charge processing if a discharging current of the first assembled battery is detected with the first current detection unit during the execution of the second charge processing.

According to this configuration, the first current detection unit detects the discharging current of the first assembled battery, and the second current detection unit detects the discharging current of the second assembled battery. Moreover, the control unit turns ON the second discharging path switch unit in the first charge processing. Then, while the first assembled battery is being charged, the second assembled battery will be able to supply the discharging current to the load via the discharge terminal. Moreover, the control unit turns ON the first discharging path switch unit in the second charge processing. Then, while the second assembled battery is being charged, the first assembled battery will be able to supply the discharging current to the load via the discharge terminal.

When the second current detection unit detects the discharging current of the second assembled battery during the execution of the first charge processing; that is, when it becomes necessary to supply current to the load, the control unit ends the first charge processing and turns ON the first discharging path switch unit to enable the first assembled battery to supply current to the load. Thereby, even during the execution of the first charge processing, if it becomes necessary to supply current to the load, the first assembled battery will be able to supply current to the load, and the first and second assembled batteries will be able to supply power to the load. Thus, the possibility of the power supply to the load becoming insufficient can be reduced.

Moreover, when the first current detection unit detects the discharging current of the first assembled battery during the execution of the second charge processing; that is, when it becomes necessary to supply current to the load, the control unit ends the second charge processing and turns ON the second discharging path switch unit to enable the second assembled battery to supply current to the load. Thereby, even during the execution of the second charge processing, if it becomes necessary to supply current to the load, the second assembled battery will be able to supply current to the load, and the first and second assembled batteries will be able to supply power to the load. Thus, the possibility of the power supply to the load becoming insufficient can be reduced.

Preferably, a first current detection unit for detecting a discharging current of the first assembled battery, a second current detection unit for detecting a discharging current of the second assembled battery, a first diode that is connected in parallel to the first discharging path switch unit so that a discharging current of the first assembled battery flows in a forward direction, and a second diode that is connected in parallel to the second discharging path switch unit so that a discharging current of the second assembled battery flows in a forward direction are further provided, and the control unit turns OFF the second discharging path switch unit in the first charge processing, turns OFF the first discharging path switch unit in the second charge processing, turns ON the first discharging path switch unit and ends the first charge processing if a discharging current of the second assembled battery is detected with the second current detection unit during the execution of the first charge processing, and turns ON the second discharging path switch unit and ends the second charge processing if a discharging current of the first assembled battery is detected with the first current detection unit during the execution of the second charge processing.

According to this configuration, the first current detection unit detects the discharging current of the first assembled battery, and the second current detection unit detects the discharging current of the second assembled battery. Moreover, discharge from the first assembled battery to the load is enabled by the first diode even when the first discharging path switch unit is OFF, and discharge from the second assembled battery to the load is enabled by the second diode even when the second discharging path switch unit is OFF. In addition, since the second discharging path switch unit is turned OFF in the first charge processing, the charging current that was received by the charge terminal is prohibited from being supplied to the second assembled battery via the second discharging path switch unit as a result of coming around from the first diode. Further, since the first discharging path switch unit is turned OFF in the second charge processing, the charging current that was received by the charge terminal is prohibited from being supplied to the first assembled battery via the first discharging path switch unit as a result of coming around from the second diode.

When the second current detection unit detects the discharging current of the second assembled battery during the execution of the first charge processing; that is, when it becomes necessary to supply current to the load, the control unit ends the first charge processing and turns ON the first discharging path switch unit to enable the first assembled battery to supply current to the load. Thereby, even during the execution of the first charge processing, if it becomes necessary to supply current to the load, the first assembled battery will be able to supply current to the load, and the first and second assembled batteries will be able to supply power to the load. Thus, the possibility of the power supply to the load becoming insufficient can be reduced.

Moreover, when the first current detection unit detects the discharging current of the first assembled battery during the execution of the second charge processing; that is, when it becomes necessary to supply current to the load, the control unit ends the second charge processing and turns ON the second discharging path switch unit to enable the second assembled battery to supply current to the load. Thereby, even during the execution of the second charge processing, if it becomes necessary to supply current to the load, the second assembled battery will be able to supply current to the load, and the first and second assembled batteries will be able to supply power to the load. Thus, the possibility of the power supply to the load becoming insufficient can be reduced.

Preferably, a voltage detection unit for detecting the respective terminal voltages of the plurality of secondary batteries is further provided, and the control unit determines that, when any one of the terminal voltages of the respective secondary batteries detected with the voltage detection unit becomes the full charge voltage or higher, the secondary battery in which the terminal voltage has become the full charge voltage or higher has been fully charged.

According to this configuration, the voltage detection unit detects the respective terminal voltages of a plurality of secondary batteries. Moreover, when any one of the terminal voltages of the respective secondary batteries detected with the voltage detection unit becomes the full charge voltage or higher, it is determined that the secondary battery in which the terminal voltage has become the full charge voltage or higher has been fully charged.

Moreover, the battery system according to one aspect of the present invention comprises first and second assembled batteries as assembled batteries in which a plurality of secondary batteries are connected in series, a charge terminal for receiving a charging current for charging the first and second assembled batteries, a charging current supply unit for supplying the charging current to the charge terminal, a discharge terminal for supplying a discharging current output from the first and second assembled batteries to a load, a first charge switch unit for opening/closing a first charging path extending from the charge terminal to the first assembled battery, a first discharging path switch unit for opening/closing a first discharging path extending from the first assembled battery to the discharge terminal, a second charge switch unit for opening/closing a second charging path extending from the charge terminal to the second assembled battery, a second discharging path switch unit for opening/closing a second discharging path extending from the second assembled battery to the discharge terminal, and a control unit for executing, upon charging the first assembled battery, first charge processing of turning OFF the first discharging path switch unit and the second charge switch unit and turning ON the first charge switch unit until all secondary batteries contained in the first assembled battery are fully charged, and executing, upon charging the second assembled battery, second charge processing of turning OFF the second discharging path switch unit and the first charge switch unit and turning ON the second charge switch unit until all secondary batteries contained in the second assembled battery are fully charged.

According to this configuration, the first and second assembled batteries are connected in parallel when viewed from the charge terminal, and the first and second assembled batteries are connected in parallel when viewed from the discharge terminal. When charging the first assembled battery, the control unit turns OFF the first discharging path switch unit and the second charge switch unit so as to prohibit the charging current that was received by the charge terminal from being supplied to the second assembled battery. Subsequently, as a result of the control unit turning ON the first charge switch unit and all secondary batteries contained in the first assembled battery being charged until they are fully charged, the variation in the state of charge between the respective secondary batteries contained in the first assembled battery will decrease. Here, since the current supply to the second assembled battery is prohibited, it is possible to reduce the unnecessary power loss upon reducing the variation in the state of charge in the first assembled battery.

Moreover, when charging the second assembled battery, the control unit turns OFF the second discharging path switch unit and the first charge switch unit so as to prohibit the charging current that was received by the charge terminal from being supplied to the first assembled battery. Subsequently, as a result of the control unit turning ON the second charge switch unit and all secondary batteries contained in the second assembled battery being charged until they are fully charged, the variation in the state of charge between the respective secondary batteries contained in the second assembled battery will decrease. Here, since the current supply to the first assembled battery is prohibited, it is possible to reduce the unnecessary power loss upon reducing the variation in the state of charge in the second assembled battery.

Industrial Applicability

The battery system and the battery pack according to the present invention can be suitably used as a battery system of electronic devices such as portable personal computers, digital cameras and cell phones, and vehicles such as electrical vehicles and hybrid cars, uninterruptable power supply systems (UPS) and the like, as well as the battery pack to be used as the power source of the foregoing systems.

The invention claimed is:

1. A battery pack, comprising:
   first and second assembled batteries as assembled batteries in which a plurality of secondary batteries are connected in series;
   a charge terminal for receiving a charging current for charging the first and second assembled batteries;
   a discharge terminal for supplying a discharging current output from the first and second assembled batteries to a load;
   a first charge switch unit for opening/closing a first charging path extending from the charge terminal to the first assembled battery;
   a first discharging path switch unit for opening/closing a first discharging path extending from the first assembled battery to the discharge terminal;
   a second charge switch unit for opening/closing a second charging path extending from the charge terminal to the second assembled battery;
   a second discharging path switch unit for opening/closing a second discharging path extending from the second assembled battery to the discharge terminal; and
   a control unit for executing, upon charging the first assembled battery, first charge processing of turning OFF the first discharging path switch unit and the second charge switch unit and turning ON the first charge switch unit until all secondary batteries contained in the first assembled battery are fully charged, and executing, upon charging the second assembled battery, second charge processing of turning OFF the second discharging path switch unit and the first charge switch unit and turning ON the second charge switch unit until all secondary batteries contained in the second assembled battery are fully charged.

2. The battery pack according to claim 1,
   wherein the secondary battery is a second battery configured such that, when charged beyond a fully charged state, the terminal voltage thereof becomes approximately constant at a prescribed full charge voltage.

3. The battery pack according to claim 2,
   wherein the secondary battery is either a nickel hydride secondary battery or a nickel cadmium secondary battery.

4. The battery pack according to claim 1, further comprising:
   a voltage detection unit for detecting the respective terminal voltages of the plurality of secondary batteries,
   wherein the control unit executes the first charge processing when the difference between a maximum value and a minimum value of the respective terminal voltages of a plurality of secondary batteries contained in the first assembled battery that are detected with the voltage detection unit exceeds a pre-set threshold voltage, and executes the second charge processing when the difference between a maximum value and a minimum value of the respective terminal voltages of a plurality of secondary batteries contained in the second assembled battery that are detected with the voltage detection unit exceeds a pre-set threshold voltage.

5. The battery pack according to claim 4,
wherein the control unit executes the first and second charge processing when the difference between a maximum value and a minimum value of the respective terminal voltages of a plurality of secondary batteries contained in the first assembled battery that are detected with the voltage detection unit exceeds a pre-set threshold voltage, and when the difference between a maximum value and a minimum value of the respective terminal voltages of a plurality of secondary batteries contained in the second assembled battery that are detected with the voltage detection unit exceeds a pre-set threshold voltage.

6. The battery pack according to claim 1,
wherein when a pre-set set time elapses after executing the previous first charge processing, the control unit executes the first charge processing once again, and
wherein, when a pre-set set time elapses after executing the previous second charge processing, the control unit executes the second charge processing once again.

7. The battery pack according to claim 6,
wherein the control unit executes the first and second charge processing when a pre-set set time elapses after executing either the first charge processing or the second charge processing.

8. The battery pack according to claim 1, further comprising:
a first current detection unit for detecting a discharging current of the first assembled battery; and
a second current detection unit for detecting a discharging current of the second assembled battery,
wherein the control unit:
turns ON the second discharging path switch unit in the first charge processing,
turns ON the first discharging path switch unit in the second charge processing,
turns ON the first discharging path switch unit and ends the first charge processing if a discharging current of the second assembled battery is detected with the second current detection unit during the execution of the first charge processing, and
turns ON the second discharging path switch unit and ends the second charge processing if a discharging current of the first assembled battery is detected with the first current detection unit during the execution of the second charge processing.

9. The battery pack according to claim 1, further comprising:
a first current detection unit for detecting a discharging current of the first assembled battery;
a second current detection unit for detecting a discharging current of the second assembled battery;
a first diode that is connected in parallel to the first discharging path switch unit so that a discharging current of the first assembled battery flows in a forward direction; and
a second diode that is connected in parallel to the second discharging path switch unit so that a discharging current of the second assembled battery flows in a forward direction,
wherein the control unit:
turns OFF the second discharging path switch unit in the first charge processing,
turns OFF the first discharging path switch unit in the second charge processing,
turns ON the first discharging path switch unit and ends the first charge processing if a discharging current of the second assembled battery is detected with the second current detection unit during the execution of the first charge processing, and
turns ON the second discharging path switch unit and ends the second charge processing if a discharging current of the first assembled battery is detected with the first current detection unit during the execution of the second charge processing.

10. The battery pack according to claim 1, further comprising:
a voltage detection unit for detecting the respective terminal voltages of the plurality of secondary batteries,
wherein the control unit determines that, when any one of the terminal voltages of the respective secondary batteries detected with the voltage detection unit becomes the full charge voltage or higher, the secondary battery in which the terminal voltage has become the full charge voltage or higher has been fully charged.

11. A battery system, comprising:
first and second assembled batteries as assembled batteries in which a plurality of secondary batteries are connected in series;
a charge terminal for receiving a charging current for charging the first and second assembled batteries;
a charging current supply unit for supplying the charging current to the charge terminal;
a discharge terminal for supplying a discharging current output from the first and second assembled batteries to a load;
a first charge switch unit for opening/closing a first charging path extending from the charge terminal to the first assembled battery;
a first discharging path switch unit for opening/closing a first discharging path extending from the first assembled battery to the discharge terminal;
a second charge switch unit for opening/closing a second charging path extending from the charge terminal to the second assembled battery;
a second discharging path switch unit for opening/closing a second discharging path extending from the second assembled battery to the discharge terminal; and
a control unit for executing, upon charging the first assembled battery, first charge processing of turning OFF the first discharging path switch unit and the second charge switch unit and turning ON the first charge switch unit until all secondary batteries contained in the first assembled battery are fully charged, and executing, upon charging the second assembled battery, second charge processing of turning OFF the second discharging path switch unit and the first charge switch unit and turning ON the second charge switch unit until all secondary batteries contained in the second assembled battery are fully charged.

* * * * *